United States Patent
Brambilla et al.

(10) Patent No.: US 6,758,495 B2
(45) Date of Patent: Jul. 6, 2004

(54) METHOD AND SAFETY RESTRAINT DEVICE FOR RESTRAINING AN OCCUPANT ON A VEHICLE SEAT

(75) Inventors: Luigi Brambilla, Boeblingen (DE); Wilfried Bullinger, Korntal-Muenchingen (DE); Walter Eberle, Hochdorf (DE); Juergen Gimbel, Gechingen (DE); Markus Hartlieb, Waldorfhaeslach (DE); Florent Paviot, Aichwald (DE); Frank Zerrweck, Altdorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/775,799

(22) Filed: Feb. 5, 2001

(65) Prior Publication Data

US 2001/0054816 A1 Dec. 27, 2001

(30) Foreign Application Priority Data

Feb. 4, 2000 (DE) .......................................... 100 05 010

(51) Int. Cl.⁷ .............................................. B60R 22/46
(52) U.S. Cl. ...................................... 280/806; 180/268
(58) Field of Search ................................. 280/806, 807; 180/268; 297/476, 477, 478, 479, 480

(56) References Cited

U.S. PATENT DOCUMENTS

| | | | |
|---|---|---|---|
| 3,838,746 A | 10/1974 | Andres ...................... 180/82 C |
| 3,918,545 A | 11/1975 | Andres et al. ............. 180/82 C |
| 5,186,494 A | * 2/1993 | Shimose ..................... 280/806 |
| 5,398,185 A | * 3/1995 | Omura ........................ 180/268 |
| 5,533,756 A | * 7/1996 | Dybro et al. ................ 280/806 |
| 5,552,986 A | 9/1996 | Omura et al. .......... 364/424.05 |
| 5,664,807 A | 9/1997 | Bohmler |
| 5,667,246 A | * 9/1997 | Miller, III ................... 280/806 |
| 5,765,774 A | * 6/1998 | Maekawa et al. ........ 242/390.9 |
| 5,788,281 A | * 8/1998 | Yanagi et al. .............. 280/806 |
| 5,835,007 A | 11/1998 | Kosiak |
| 6,131,951 A | * 10/2000 | Chicken et al. ............. 280/806 |
| 6,213,512 B1 | * 4/2001 | Swann et al. ............... 280/806 |
| 6,332,629 B1 | * 12/2001 | Midorikawa et al. ....... 280/806 |
| 6,374,168 B1 | * 4/2002 | Fujii ........................... 701/45 |

FOREIGN PATENT DOCUMENTS

| | | |
|---|---|---|
| DE | 2 159 265 | 6/1973 |
| DE | 2 227 121 | 1/1974 |
| DE | 22 49 759 | 4/1974 |
| DE | 41 12 579 | 10/1991 |
| DE | 43 19 380 | 12/1993 |
| DE | 44 11 184 | 10/1994 |
| DE | 195 11 457 A1 | 10/1996 |
| DE | 19520721 | 12/1996 |
| EP | 0 560 181 | 9/1993 |
| EP | 0893313 | 1/1999 |
| GB | 1 384 988 | 2/1975 |
| JP | 02-046420 | 10/1990 |
| JP | 07-081520 | 3/1995 |
| JP | 8-268224 | 10/1996 |
| JP | 2539360 | 4/1997 |
| JP | 09-132113 | 5/1997 |
| JP | 10-059130 | 3/1998 |
| JP | 11-278216 | 10/1999 |
| WO | 99/51469 | 10/1999 |

* cited by examiner

Primary Examiner—David R. Dunn
(74) Attorney, Agent, or Firm—Crowell & Moring LLP

(57) ABSTRACT

A method and system for restraining an occupant on a vehicle seat, the occupant being pulled into the vehicle seat is provided with a force by a belt tensioner when a critical driving state is detected and then held in a pulled-back position on the vehicle seat with a holding force. The holding force selected is lower than the force for pulling the occupant back. A forward-looking detection system for a dangerous driving state and an occupant-position detection system unprovided, in which, when a dangerous driving state is detected, a belt tensioner is subjected to a force and the occupant is thereby pulled into the vehicle seat, and in which the occupant is held in a pulled-back position on the vehicle seat with a holding force which is lower than the force for pulling the occupant back.

26 Claims, 5 Drawing Sheets

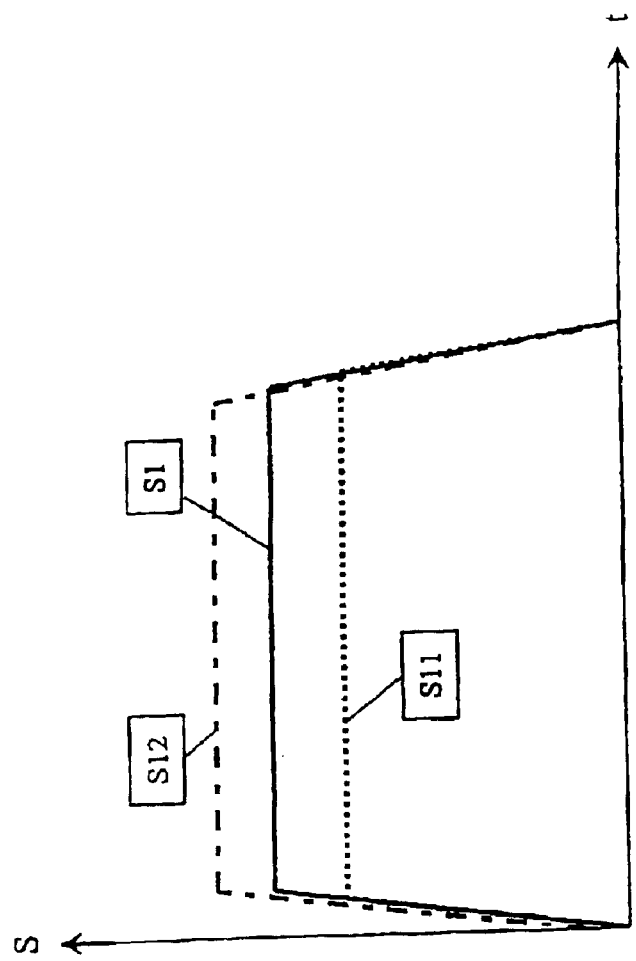

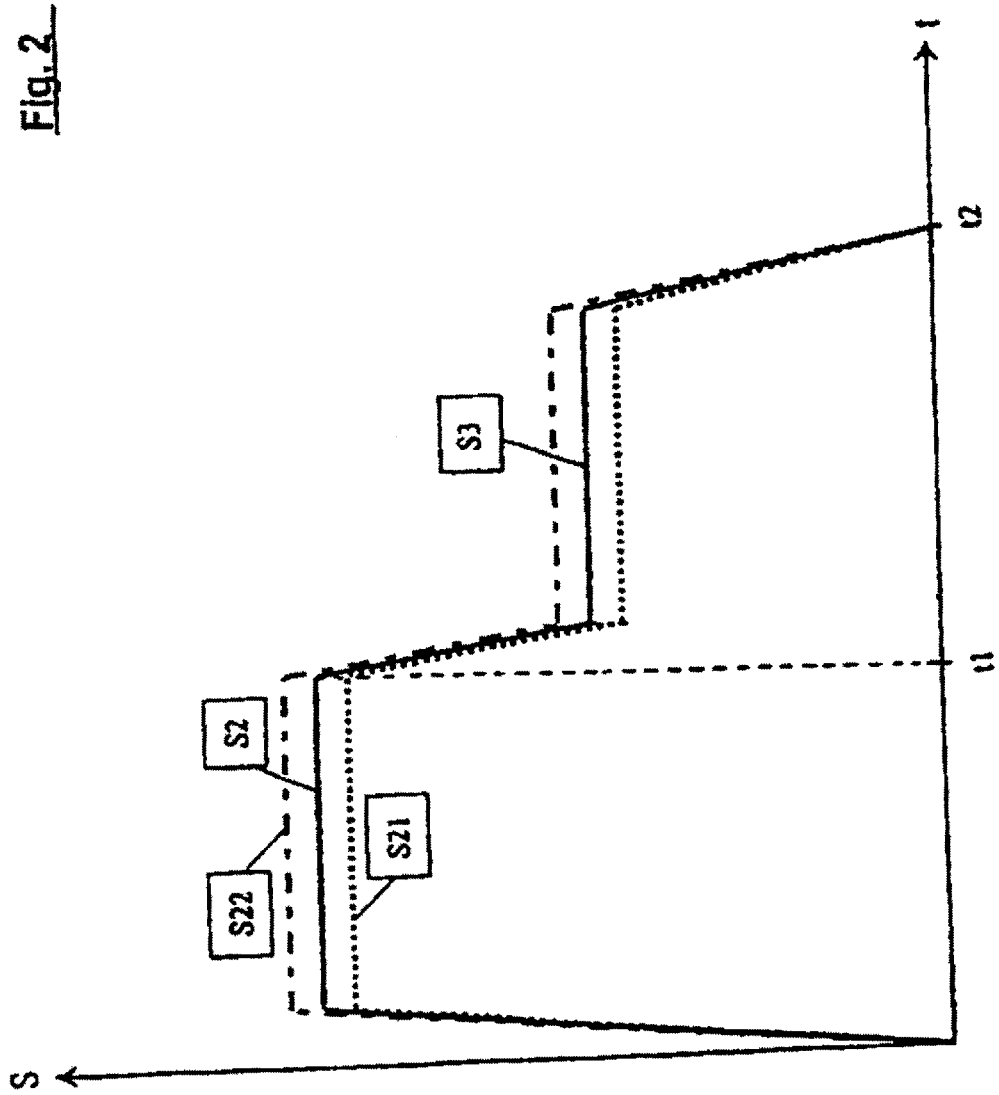

METHOD AND SAFETY RESTRAINT DEVICE FOR RESTRAINING AN OCCUPANT ON A VEHICLE SEAT

BACKGROUND AND SUMMARY OF THE INVENTION

This application claims the priority of German Patent Document 100 05 010.7, filed in Germany on Feb. 4, 2000, the disclosures of which is expressly incorporated by reference herein.

The invention relates to a method for restraining an occupant on a vehicle seat and to a safety restraint device for restraining the occupant on a vehicle seat during a traffic accident.

Safety restraint systems are now fitted to most seats in motor vehicles. They serve to minimize injuries to occupants if the vehicle is involved in an accident. Active systems such as, in particular, safety belts and so-called airbags are used in this context nowadays.

Safety belts have been used in motor vehicles for a long time now. There are therefore also many different types of so-called belts used to ensure the safety of people in vehicles. Thus, for example, many vehicles are fitted with commercially available belts which are arranged at either two or three fixing points in the vehicle and are intended to prevent the bodies of the people in the vehicle from flying forwards due to inertia if the vehicle suddenly brakes sharply or strikes an obstacle.

If a vehicle strikes an obstacle, especially at high speed, the occupants are thrown forwards due to inertia. If no safety devices have been fitted, such accidents generally result in severe and, in some cases, fatal injuries to people in the vehicle. If the vehicles' equipment includes safety belts, on the other hand, the occupants do generally have a chance of survival but injuries are frequent, especially in the area of the chest and shoulders. The reasons for this are that the occupants are often in a sitting position in which they are not resting against the backrest.

To avoid the belt being too long when there is an impact or sharp braking, German Patent Document DE-A 22 27 121 for example describes a restraining belt system in which use is made of a belt tensioner that pulls the seat belt back when the vehicle is involved in a collision. This makes it possible to ensure that the occupant is in the most favorable sitting position for him during the impact.

German Patent Document DE 44 11 184 (corresponding U.S. Pat. No. 5,552,986) describes a restraining belt system in which a tightening force exerted on the seat belt is controlled in three steps. With the aid of a so-called pretensioner, the seat belt is namely tensioned only up to a predetermined pretensioning force before a vehicle collision, this pretensioning force then invariably being relaxed in a second step if the expected vehicle collision against which this precaution has been taken does not occur. In a third step, the additional belt tensioner will pull the seat belt back at a higher pretensioning force, this occurring when an actual vehicle collision is detected.

German Patent Document DE-A 2 159 265 (corresponding U.S. Pat. No. 3,838,746) has described a restraint device in which a pretension on the holding belts is built up when the brake is actuated. At the moment of collision, the belts are thus resting on the body of the occupant with a pretension that is still tolerable.

European Patent Document EP 0 560 181 describes a driving device for moving motor-vehicle components from a normal position into a safety position. The sensor used for this responds to an excessive change in the speed of the vehicle, after which a gas generator arranged in a piston releases a pressurized gas by ignition and thereby drives the piston, by means of which the safety-belt restraint system can then be activated, for example.

In the holding system for motor vehicle occupants described in German Patent Document 22 49 759 C2 (corresponding U.S. Pat. No. 3,918,545), the safety belt is tensioned above a predefined acceleration threshold, and the magnitude of the pretensioning force is set as a function of the change in vehicle speed per unit time and/or the weight of the occupant.

However, all these safety systems known from the prior art have the disadvantage that the belt slack is removed by a pretensioning system before an accident but the belt force is not adapted to the sitting position, and the load on the occupant is therefore high.

Starting from this known prior art, an object on which the invention is based is to provide a method and a safety restraint device for restraining an occupant on a vehicle seat by means of which it is possible to minimize the loads on the occupant when pretensioning the belt slack but, at the same time, to set it at a required level.

This object is achieved according to preferred embodiments of the invention by providing a method and system for restraining an occupant on a vehicle seat, comprising:
pulling the occupant into the vehicle seat with a predetermined pullback force by a belt tensioner when a critical driving state is detected, and
subsequently holding the occupant in a pulled-back position on the vehicle seat with a predetermined holding force,
wherein the predetermined holding force is lower than the predetermined pullback force.

With the solution according to the invention, the occupants in a vehicle, especially the front seat passenger, who is not always in a position completely towards the back and may even be leaning forwards (out of position), are first of all pulled back into the seat with a certain force and are then held with a holding force, which can be chosen to be lower, during the critical vehicle state.

This advantageously makes it possible to minimize any possible injuries to the occupants with safety systems.

This method according to the invention can be implemented, in particular, by means of a safety restraint device according to the invention for restraining the occupant on a vehicle seat during a critical driving state, in which the safety belt, a belt tensioner or the like is subjected to a force in the event of a dangerous driving state, the occupant thereby first of all being pulled into the vehicle seat and then held in a pulled-back position on the vehicle seat with a lower holding force.

An apparatus of this kind has proven advantageous for carrying out a method according to the invention in all imaginable critical driving states. Examples are full braking or a vehicle impact, rollover or when the vehicle swerves or slides sideways. By restraining the occupant before an accident, it is namely not only possible to reduce the risk of injury, as described above, but, especially in the case of swerving, there is the fact that the driver is held in a safe position on the seat during the critical state. Secured in this way, the driver can thus maneuver the vehicle more effectively and hence actively contribute to stabilization of the driving state.

Further advantages, advantageous refinements and developments of the invention will emerge from the subclaims and the exemplary embodiments explained below with reference to the drawing, the drawing showing preferred embodiments of the method according to the invention and the safety restraint device for restraining an occupant on a vehicle seat.

Other objects, advantages and novel features of the present invention will become apparent from the following detailed description of the invention when considered in conjunction with the accompanying drawings.

BRIEF DESCRIPTION OF THE DRAWINGS

FIG. 1 shows a diagram illustrating the variation in the force of the belt tensioner against time according to the methods used hitherto in the prior art;

FIG. 2 shows a diagram illustrating the variation in the force of the belt tensioner against time according to a preferred embodiment of the method according to the invention;

DETAILED DESCRIPTION OF THE INVENTION

FIG. 1 illustrates the situation pertaining in the case of emergency braking or panic braking before a critical driving state, the occupants being restrained by a method known from the prior art. Here, the variation in the force S is shown against time t.

In the case of emergency braking triggered by the driver himself or, alternatively, with the aid of a brake assist system or an automatic braking system, the reversible belt tensioner is activated, and a force level S1 as indicated in FIG. 1 is selected. This force level corresponds to a holding force Si for an average occupant predetermined by means of tests, for example. The occupant is thus held even before the accident.

It would additionally be possible here to determine the weight of the occupant with the aid of a weight detection system and to raise the force level S to a higher level S12 for heavier occupants or lower it to a lower level S1 for light occupants.

In the method according to the invention for restraining an occupant on a vehicle seat, in contrast to the above method, which is already known from the prior art and is also frequently used nowadays, the occupant is pulled into the vehicle seat with a certain force S2 by means of a belt tensioner—as illustrated schematically in FIG. 2—when a critical driving state is detected and is then held in a pulled-back position on the vehicle seat with a holding force S3. Here, the selected holding force S3 on the occupant is lower than the force S2 used to pull the occupant back.

Figure 1A:
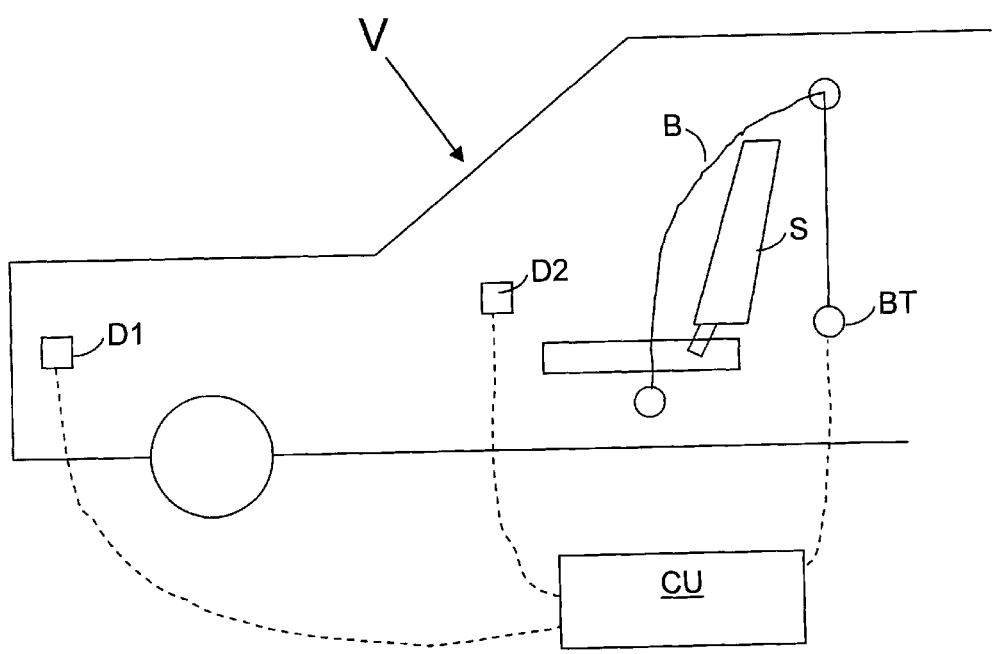
FIG. 1A is a schematic depiction of a safety restraint system constructed according to a preferred embodiment of the invention.

FIG. 1A schematically depicts a vehicle with a passenger restraint system according to preferred embodiments of the invention.

In FIG. 1A, a passenger vehicle V includes a passenger seat 5, a seat belt B, and a seat belt tensioner BT. A forward looking detection system D1 detects a critical driving condition of the vehicle and an occupant position detection system D2 detects a vehicle occupant position on the seat S. A control unit CU controls the operation of the belt tensioner BT as a function of signals from the detection systems D1 and D2.

With an occupant-position detection system, it would be possible in the case of the method illustrated in FIG. 2 to detect whether the occupant is in a normal sitting position, for example, and for activation to be performed in a manner dependent on this. The position of the occupant can be detected by means of an infrared sensor system, an ultrasonic sensor system, a radar sensor system, a belt extension measurement system, by means of the position of the seat and the backrest and/or measurement of the movement of the vehicle or vehicle drive unit, for example.

If the occupant is in a forward position, e.g. in an "out of position" sitting position relative to the airbag, which will generally be the case with the front-seat passenger, in particular, he will be pulled back into the vehicle seat, i.e. into the normal sitting position, with the force S2 and, after a time t1, will be held with a lower force S3 during the entire critical vehicle state.

In this context, it has been found that the force S2 for pulling the occupant back is advantageously between 200 and 1500 N (Newtons). Although the biomechanical limits for the force to which an occupant can be subjected is 6000 N in the case of healthy people, a force of between 200 and 1500 N has proven to be normally fully sufficient for pulling back. This allows the pull-back process to be made very acceptable for the occupant and injuries to be excluded.

The holding force S3 after the occupant has been pulled back, on the other hand, should advantageously be between 100 and 600 N. For reasons of acceptability and, in particular, to avoid injuries caused by the safety belt, this force level should be kept as low as possible. A high level of safety should be ensured however. It has been found to be particularly advantageous if this force for holding the occupant is about 100 to 600 N.

Reducing the force after pull-back is possible because the occupant has already been pulled back into the seat and, as a result, there is no free movement of the occupant due to an excessive length of belt during full braking.

It is particularly advantageous in the case of the method according to the invention if the forces, i.e. the holding force and the force for pulling the occupant back, are adapted to the respective weight of the occupant. It is also possible in a particularly advantageous manner for the belt forces to be adapted to the position of the belt, i.e. the position of the seat.

As illustrated in FIG. 2, this means that, with weight sensors on or at the vehicle seat, the respective force level S2 or S3, i.e. the holding force and pull-back force, can be appropriately raised (to S22) for heavy occupants or lowered (to S21) in order to ensure not only optimum retention but also maximum comfort for the occupant.

In addition, the holding force S3 can also be adapted to the vehicle deceleration. This is another way of further optimising the force level, i.e. ensuring optimum retention of the occupant on the vehicle seat while keeping the force as low as possible to enable the loads caused by the safety belt to be kept down and ensure that the occupant is as comfortable as possible.

This also applies if the holding force S3 is adapted to the vehicle speed.

According to a preferred embodiment of the method according to the invention, the switch from a higher force level of the force S2 for pull-back to a lower force level S3 for holding can be made after a predetermined time. With reference to FIG. 2, this means that the time t1 is, for example, a statistical value determined by means of tests.

In this context, use is made of a particular empirical value for the time t1, this being the time at which the occupant has very probably been pulled back into the seat by the force S2. The switch is then made to the lower level of the holding force S3.

However, it would also be conceivable for the switch from the higher to the lower force level to be made as a function of the occupant's position. In such an embodiment of the method according to the invention, the force for pull-back and the holding force can be applied in a precisely proportioned manner, and the occupant is not needlessly subjected to a large force while already in the pulled-back position.

However, the switch from the higher to the lower force level could equally well be made by measuring the travel and/or speed of the belt strap since this is an indirect indicator of the occupant's position.

It is particularly preferable if, when calculating the movement of the occupant, the switch from the higher force level S2 to the lower force level S3 is made by combining the following parameters: belt force, occupant's position, vehicle deceleration and/or measuring the belt travel and the movement of the drive or characteristics of the drive (current, power). With this combination of parameters, the switch can be made very accurately at the moment at which the occupant is indeed really in the pulled-back position.

According to another preferred embodiment of the invention, the switch from a higher to a lower force level is made by means of drive data, such as the direction of rotation in the case of the electric motor for example or the current consumption and/or power consumption of the drive.

It has generally been found that the belts should preferably be tensioned separately for each vehicle seat. This means that the respective parameters, such as the weight and position, of each occupant are determined separately.

A trigger criterion for belt tensioners can be derived by determining critical driving situations and/or with the aid of a forward-looking sensor system.

In the method according to the invention, the critical vehicle state is advantageously detected by monitoring the steering angle, distance from an object, relative velocity, vehicle deceleration, yaw angle, yaw rate, yawing acceleration, vehicle's own speed, steering angle, sharp changes in direction, jump in the adhesion coefficient, lateral acceleration, wheel speed and/or angle of inclination or any combination of these parameters.

This means therefore that when emergency braking occurs, triggered by corresponding actuation of the accelerator pedal and/or the brake pedal and detection of an object by a forward-looking sensor system or even by the brake assist system, the belt tensioner is activated and a force level S2 (see FIG. 2) is selected. In this context, the sensor system can either measure or calculate the distance and relative velocity, for example, the force S2 thus depending on the distance and relative velocity.

Using the distance from the object, the relative velocity, vehicle's own speed, vehicle deceleration or even the friction coefficient as parameters, for example, a time of collision is determined from this, i.e. the time the reversible belt tensioner has to spare before the time of collision, and the parameters comprising the occupant's position and occupant's weight are used to calculate a force level S2 (or S21 or S22) sufficient to move the occupant into an uncritical, i.e. pulled-back, position.

The position and movement of the occupant are measured by occupant position detection and/or belt strap travel measurement and/or measurement of movement and/or measurement of rotational speed and/or current consumption and/or power consumption of the drive of the safety belt, e.g. of the electric motor. If the occupant has reached an uncritical position at time t1, a switch can be made to force level S3, which can in turn also be adapted to the weight, as already described with reference to S2. Here, the force S3 then corresponds to the holding force at the corresponding vehicle deceleration and corresponding occupant weight.

The application of the method according to the invention with the forward-looking sensor system, by means of which a critical driving state can be detected and which calculates a time of collision and probability of collision as a function of the direction of motion of the vehicle in which it is installed, which is determined from the steering angle, vehicle's own speed, longitudinal and lateral acceleration, yaw angle and/or yaw rate, is described with reference to FIG. 3.

If the occupant position detection system detects an occupant in a critical position, the occupant weight detection system is used to determine a force level S4 that moves the occupant into an uncritical position.

Figure 3:
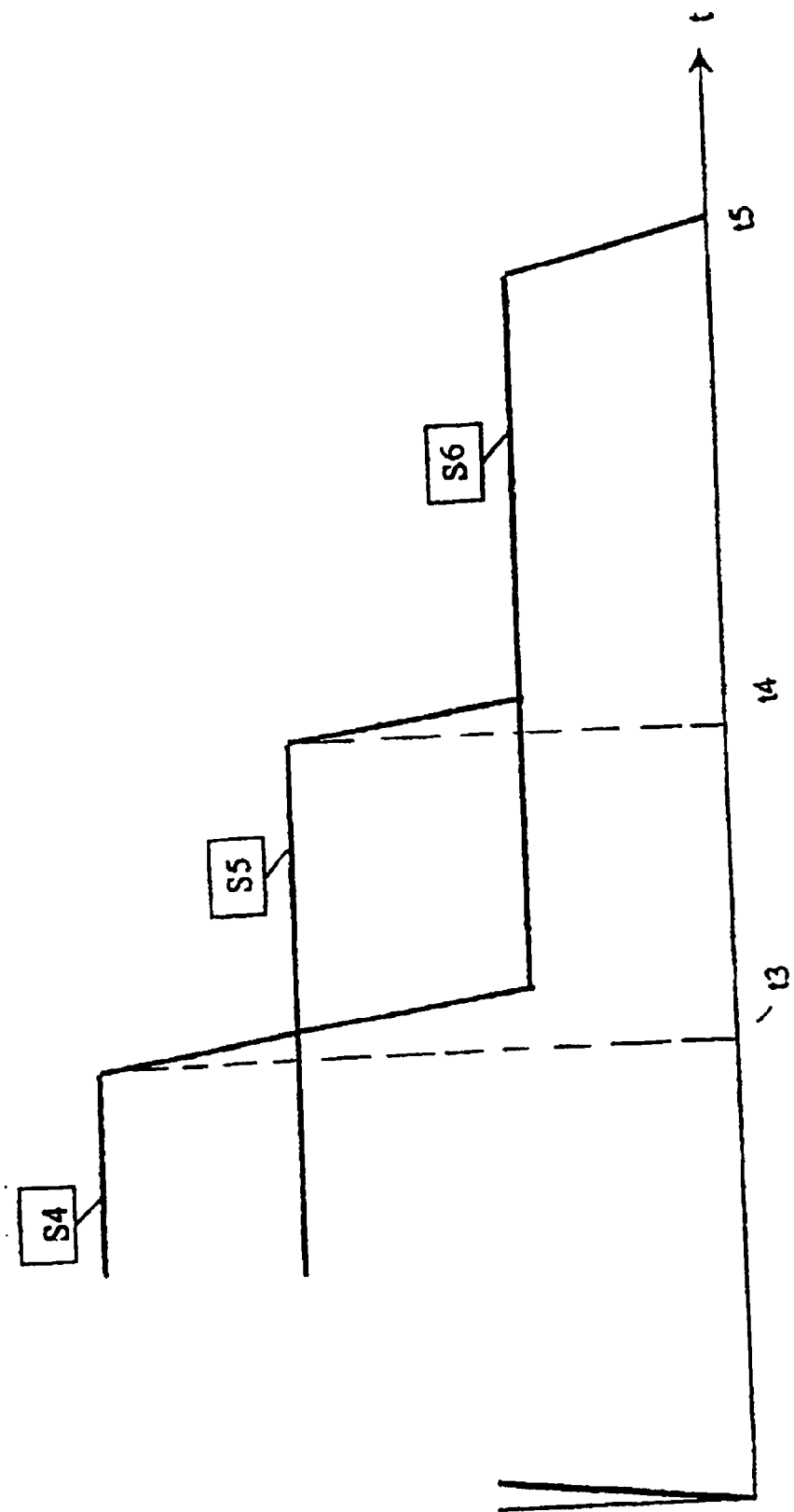
FIG. 3 shows a diagram illustrating the variation in the force of the belt tensioner against time according to a preferred embodiment of the method according to the invention, the tensioning of the belt being dependent on the relative velocity and time to spare before the accident.

According to this preferred embodiment of the method, the force level S4 is dependent on the time left before the accident, on the occupant's position and the occupant's weight and can therefore assume different values, as illustrated by the force values S4 and S5 and time values t3 and t4 in FIG. 3.

In practice, it is furthermore known that, with many accidents, swerving often takes place before the accident. This leads, in particular, to critical sitting positions among the occupants, i.e. to lateral displacement, that is to say the occupant is too close to the windscreen or B post of the vehicle, for example.

Lateral displacement occurs especially when there is a sharp change in direction, a jump in the adhesion coefficient or a collision, e.g. with a curbstone or curb. This then leads to dangerous lateral displacement of the occupant, resulting in an increased risk of injury in a subsequent accident. Moreover, other safety devices may thereby be impaired. In addition, a sharp lateral displacement may in itself be sufficient to prevent the driver from steering the vehicle in a controlled manner.

According to another embodiment of the method according to the invention, the vehicle parameters comprising the steering angle, yaw rate, yawing acceleration, lateral acceleration and wheel speeds are therefore preferably used to determine the movement of the vehicle, particularly in the lateral direction. If there is a deviation in the direction of the vehicle from that specified by the driver, the occupant is pulled back into the seat with a force level S2 and strapped to the seat with a force level S3. The permitted deviation from the specified direction of travel is affected especially by the vehicle's own speed, the direction of travel and road conditions. These factors can be determined by methods familiar to the person skilled in the art.

In the case of all the embodiments described above, belt tensioning is preferably ended when the vehicle has come to a halt or an uncritical driving state is detected from the vehicle data.

This means that the safety restraint device according to the invention is advantageously designed in such a way that the belt tensioner is reversible.

This is advantageous particularly because it may be possible to continue as normal following a critical state. Since the safety belt is no longer tensioned, the driver has the freedom of movement to which he is accustomed and can therefore continue to drive the vehicle without first having to go to a garage or carry out repairs or unlock the system manually himself.

However, ending belt tensioning in this way is also advantageous in order to ensure that the occupant has a large freedom of movement after an accident. Under certain circumstances, this means that he can undo the belt easily and leave the vehicle quickly if required.

According to a preferred embodiment of the invention, a restraint device according to the invention could be provided in a form such that, after tensioning or the occupant being pulled back, the occupant could also be held by means of pawls that are released again when the vehicle is stationary or traveling normally. This technical implementation requires a higher power only for a short time.

The invention will be explained in even greater detail below with reference to a block diagram shown in FIG. 4, the safety restraint device having a forward-looking detection system that can detect a collision, swerving and/or rollover. This means that it should be possible to activate the restraint device in any conceivable critical driving state.

Figure 4:
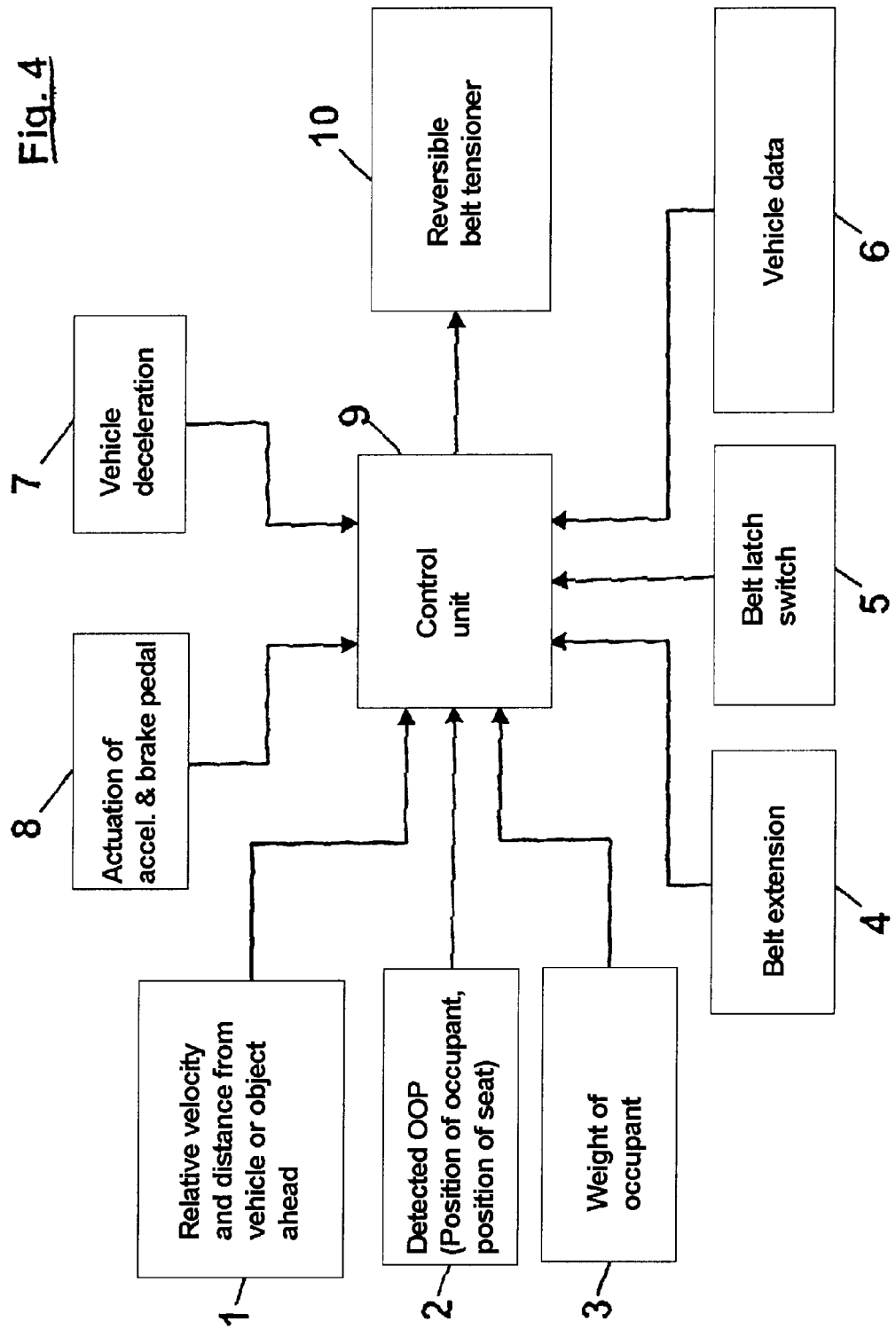
FIG. 4 shows a block diagram illustrating a preferred embodiment of the method according to the invention in a highly schematized form.

As can be seen in FIG. 4, the relative velocity and distance with respect to the vehicle ahead or a stationary vehicle or object is measured with a device 1 for forward-looking detection, which is connected, for example, to radar sensors, infrared sensors and/or an image-processing system such as a CCD camera and image evaluation system.

Another device 2 determines the occupant's position, preferably by means of infrared sensors, image processing (CCD camera and image evaluation system), capacitive sensors and/or radar sensors. This allows an "out of position" position, that is to say an unfavorable position of the occupant relative to the seat, to be detected.

It can be advantageous here if systems already present in the vehicle for measuring the relative velocity, distance and occupant's position can be used, thereby allowing the additional structural outlay due to the safety restraint device according to the invention to be kept to the minimum.

According to a preferred embodiment, pressure-dependent films can be provided in the seat cushion as a means 3 for detecting the weight of the occupant. Such an embodiment has proven advantageous because the structural outlay associated with it may be regarded as very low.

However, it would also be possible in addition for the weight of the respective occupant to be measured by means of weight sensors on the seat. Weight estimation involving an image-processing system (such as a CCD camera and image evaluation system) is also conceivable.

According to the preferred embodiment shown in FIG. 4, the movement of the occupant in a critical driving situation is measured by means of the belt extension determination device 4. This has proven advantageous particularly because it is thereby possible to detect rapid movements of the occupant such as those during braking or swerving. This is also possible by means of an image-processing system, although this requires a relatively high outlay. However, measurement by means of an infrared sensor system would also be conceivable, although distinguishing between movements of the upper body and movement of the arms is problematic here.

According to a preferred embodiment of the invention, the belt tensioner is activated only when the respective occupant of the seat is actually belted in. This means that activation of the reversible belt tensioner as illustrated in FIG. 4 is performed by interrogation of the belt latch mechanism 5.

According to the preferred embodiment of the invention, which is shown in FIG. 4, a system for detecting vehicle data 6, e.g. the vehicle's own speed, steering angle, yaw angle, yaw rate, etc., is also additionally used to influence the triggering and deactivation algorithm for the reversible belt tensioner.

Detection of the vehicle deceleration 7 is preferably also used in addition to the weight of the occupants to control the belt force. This makes it possible to further optimize the respectively required force to be applied.

Evaluation 8 of the actuation of the accelerator and/or brake pedal can also be used as a further trigger criterion for the reversible belt tensioner in addition to the relative velocity and distance with respect to a vehicle or object traveling ahead or one that is stationary. This is another way of optimising the method according to the invention even further.

As can be seen from FIG. 4, all the data from the detection devices and calculation units described or any combination of these data are fed to a control unit 9, which then compares them with predetermined limiting values and triggers the reversible belt tensioner 10 if these values are exceeded and, as described above, applies different forces to the occupants, it being possible, in turn, for these forces to be dependent on the parameters determined.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Method for restraining an occupant on a vehicle seat, comprising:
   pulling the occupant into the vehicle seat with a predetermined pullback force by a reversible belt tensioner when a critical driving state is detected so that the occupant moves backward toward the vehicle seat, wherein the critical driving state may, but does not necessarily, lead to an accident,
   subsequently holding the occupant in a pulled-back position on the vehicle seat with a predetermined holding force, wherein the predetermined holding force is lower than the predetermined pullback force, and
   if the critical driving state ceases at any time without an accident, reversing the reversible belt tensioner to release pulling or holding force.

2. Method according to claim 1, wherein the holding force is between 100 N and 600 N.

3. Method according to claim 1, wherein the pullback force is between 200 N and 1500 N.

4. Method according to claim 1, wherein at least one of the pullback and holding forces is adapted to a respective weight of the occupant.

5. Method according to claim 1, wherein the holding force is adapted based on the vehicle deceleration.

6. Method according to claim 1, wherein the holding force is adapted based on the vehicle speed.

7. Method according to claim 1, wherein the switch from a higher force level of the pullback force to a lower force level of the holding force is made after a predetermined time.

8. Method according to claim 1, wherein the switch from the higher to the lower force level is made as a function of the occupant's position.

9. Method according to claim 1, wherein the switch from the higher to the lower force level is made by measuring at least one of the travel and speed of the belt strap.

10. Method according to claim 1, wherein the switch from the higher to the lower force level is made by calculating the movement of the occupant from at least one of the belt force, occupant's position, vehicle deceleration and measuring the belt travel and the movement of the drive or characteristics of the drive.

11. Method according to claim 1, wherein the switch from the higher to the lower force level is made by means of drive data.

12. Method according to claim 1, wherein the vehicle includes more than one seat, and wherein belts are tensioned separately at each vehicle seat.

13. Method according to claim 1, wherein the critical vehicle state is detected by monitoring at least a selection of at least one of the following parameters: steering angle, distance from an object, relative velocity, vehicle deceleration, yaw angle, yaw rate, yawing acceleration, vehicle's own speed, steering angle, sharp changes in direction, jump in adhesion coefficient, lateral acceleration, wheel speed and angle of inclination.

14. Method according to claim 1, wherein the holding force is relaxed when the vehicle has come to a halt or an uncritical driving state is detected from the vehicle data.

15. Method according to claim 7, wherein the pullback force is between 200 and 1500 Newtons.

16. Method according to claim 7, wherein the holding force is between 100 and 600 Newtons.

17. Method according to claim 15, wherein the holding force is between 100 and 600 Newtons.

18. Safety restraint device for restraining the occupant on a vehicle seat during a critical driving state, comprising:
   a safety belt,
   a reversible safety belt tensioner,
   a forward-looking detection system for detecting a dangerous driving state,
   an occupant-position detection system, and
   a control unit operable to control the safety belt tensioner to apply a predetermined pullback force on the safety belt to pull an occupant into the vehicle seat in response to detection of a critical driving state by the forward looking detection system so that the occupant moves backward toward the vehicle seat, wherein the critical driving state may, but does not necessarily, lead to an accident, to subsequently apply a predetermined holding force on the safety belt to hold the occupant in a pulled back position on the vehicle seat, wherein the predetermined holding force is less than the predetermined pullback force, and to reverse the reversible belt tensioner to release pulling or holding force if the critical driving state ceases at any time without an accident.

19. Safety restraint device according to claim 18, wherein the forward-looking detection system has a radar sensor for detecting at least one of a collision, vehicle swerving, and vehicle rollover.

20. Safety restraint device according to claim 18, wherein the forward-looking detection system has an infrared sensor for detecting at least one of a collision, vehicle swerving and vehicle rollover.

21. Safety restraint device according to claim 18, wherein the forward-looking detection system for detecting at least one of a collision, vehicle swerving and vehicle rollover has an image-processing system.

22. Safety restraint device according to claim 18, wherein the belt tensioner is activated only when the occupant-position detection system detects that the respective occupant of the seat is belted in.

23. Safety restraint device according to claim 22, wherein the occupant-position detection system includes a belt-latch switch operable to detect whether a respective occupant of the seat is belted in.

24. Safety restraint device for restraining the occupant on a vehicle seat during a critical driving state, comprising:
   a safety belt,
   a safety belt tensioner,
   an occupant position detection system,
   a detection system for detecting a dangerous driving state, and
   a control unit operable to control the safety belt tensioner to apply a predetermined pullback force on the safety belt to pull an occupant into the vehicle seat in response to detection of a critical driving state so that the occupant moves backward toward the vehicle seat, wherein the critical driving state may, but does not necessarily, lead to an accident, to subsequently apply a predetermined holding force on the safety belt to hold the occupant in a pulled back position on the vehicle seat after the occupant position detection system has detected that the occupant has been pulled back and is in an uncritical position, wherein the predetermined holding force is less than the predetermined pullback force.

25. Safety restraint device according to claim 24, wherein the detection system can detect at least one of a collision, vehicle swerving, and vehicle rollover.

26. Safety restraint device according to claim 24, wherein the belt tensioner is activated only when the occupant-position detection system detects that the respective occupant of the seat is belted in.

* * * * *